United States Patent Office 3,275,384
Patented Sept. 27, 1966

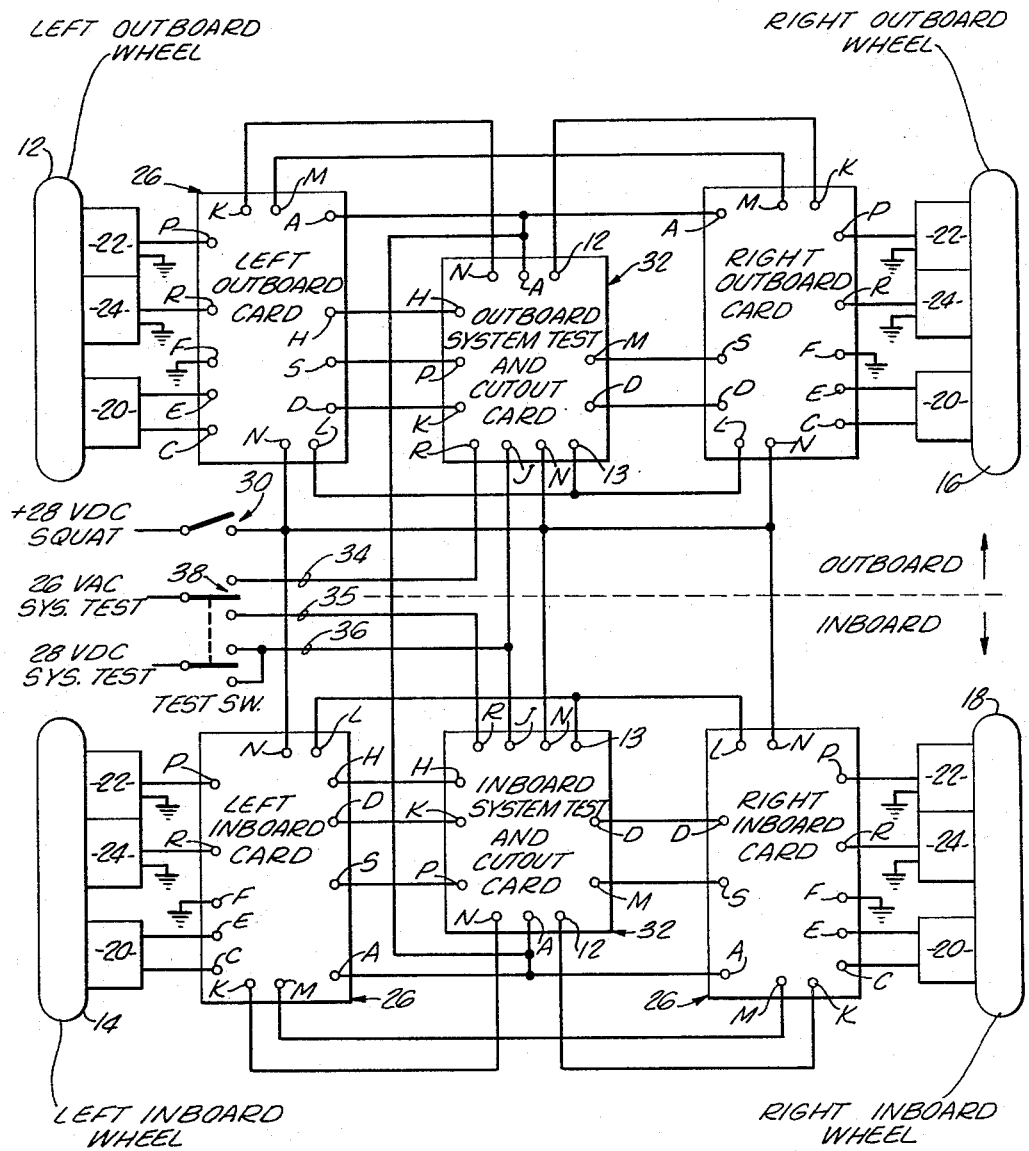

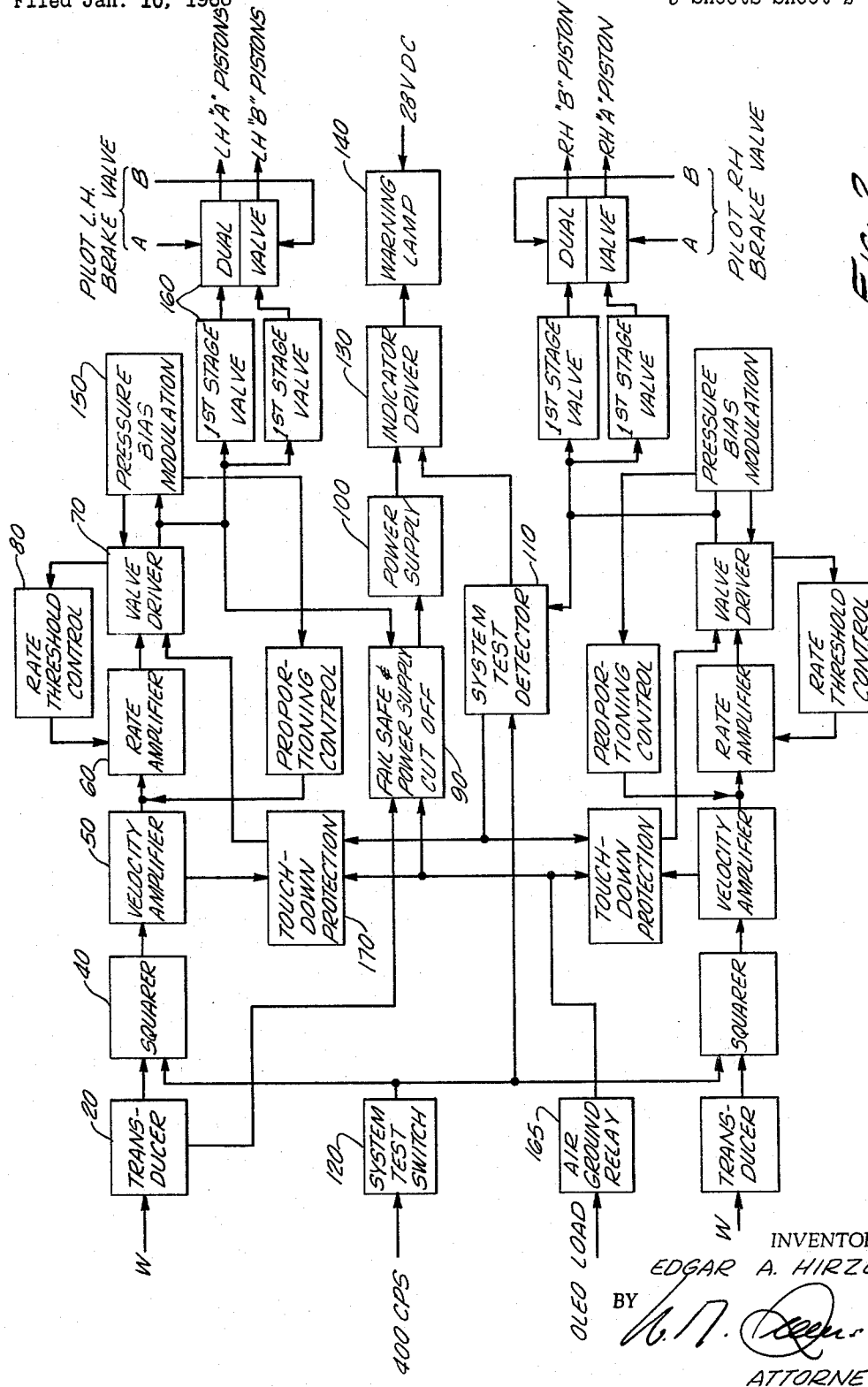

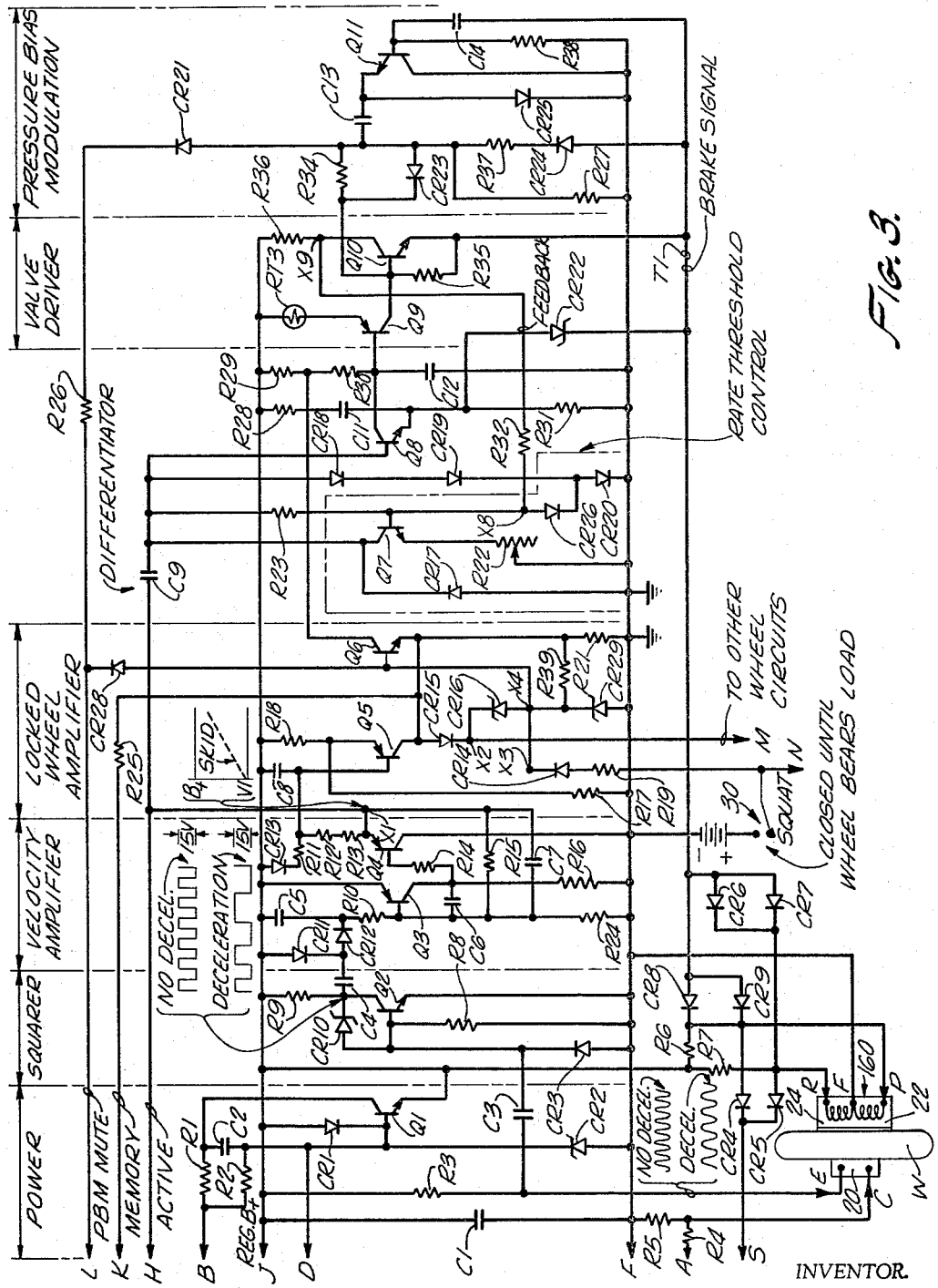

3,275,384
AUTOMATIC BRAKE CONTROL SYSTEM
Edgar A. Hirzel, Granada Hills, Calif., assignor to Crane Co., Chicago, Ill., a corporation of Illinois
Filed Jan. 10, 1966, Ser. No. 519,768
5 Claims. (Cl. 303—21)

The invention herein disclosed pertains to brake-control systems for vehicles, such as road vehicles and larger aircraft, which have a plurality of independent load-bearing wheels each equipped with an independent or respective brake and which are subjected to extremes of application of braking effort.

Several and varied types of control systems directed to such vehicles are known in the prior art, among which may be cited those disclosed in the following United States patents, viz: Wilson, 2,788,186; Yarber, 3,017,145; Brown, 2,874,810; Yarber, 2,663,521; Ruof, 3,026,148; Smith, 3,131,975; Ruof, 3,034,836; and those disclosed in pending applications for patent Serial Nos., 221,650, filed August 15, 1962, and 217,509, filed July 25, 1962, assigned to the assignee of the present invention.

More specifically, the present invention is directed to improvements upon brake control systems of the types disclosed in the aforementioned pending applications, to which reference may be made for details of components not herein shown and described in detail. In the prior art systems noted, each wheel or wheel unit is equipped with a brake, hydraulic brake-actuating means, and electrically-controlled valve means for metering hydraulic fluid under pressure to the brake actuating means under the influence of electrical control-circuit means. The circuit means comprises a wheel-operated transducer which is effective to provide an A.C. electric wave having a frequency proportional to the rotational speed of the wheel. By various means, an electric potential signal representative of the rate of rotational deceleration of the wheel is produced, and similarly a reference standard signal is derived which is representative of the maximum permissible deceleration rate. The instantaneous deceleration rate signal is continuously compared with the standard, and when a disparity therebetween occurs indicative of wheel deceleration in excess of the permissible maximum and thus representing incipient skidding of the wheel, a valve-controlling signal is produced which is effective to cause valve operation to reduce application of the brake means and thus reduce the applied braking effort whereby the wheel may again attain a deceleration rate not in excess of the permissible maximum.

As in the case of most mechanical and electro-mechanical systems, a certain amount of what may aptly be termed system inertia must be overcome after a signal for action is produced before the demanded action is effected. Thus in the noted prior art brake control systems, as a wheel commences to skid or enter into incipient-skidding condition and control-signal generation is initiated, a certain amount of time elapses before the control signal actually causes valve movement. An even more pronounced adverse inertia may be experienced due to loss of brake fluid from the brake as a result of the initial skid control signal resulting in a pronounced delay in resumption of braking upon demand. Primarily the present invention is directed to an improved braking system featuring means for substantially reducing the time required for effecting brake reapplication after occurrence of an indication of need for such action.

Briefly, the noted primary objective of the invention is attained principally by reducing the time required for production of an augmented or modulated valve-control signal upon a call for increased braking, and secondarily, by temporary production of a valve-control signal which augments the rise of braking fluid pressure to expedite restoration of braking; whereby the valve-controlling signal decays sharply momentarily for a period of time sufficient to expedite rapid brake response to compensate for inertia such as the mechanical inertia of the valve and brake actuating means and of the hydraulic fluid system. In general, according to the invention, means are provided whereby upon demand for restored braking a valve-controlling signal is produced to provide rapid return of pressurized fluid to the brake under the control of pressure biased modulation components of the system. In certain respects, except as hereinafter explained in detail, a brake-control system according to the invention may be similar to one or another of the systems disclosed in the above-identified co-pending applications for patent, the disclosures of which are incorporated herein by reference for a fuller understanding of that portion of the prior art.

Another object of the invention is to provide general improvements in brake-control systems for vehicles comprising a plurality of independent load-bearing wheels.

Other objects and advantages of the invention will hereinafter be stated or made evident in the appended claims and the following description of a preferred physical system according to the invention, the description containing references to the accompanying drawings forming part of this disclosure and specification. In the drawings:

FIGURE 1 is a functional block diagram illustrating the mode of applying the novel system to provide central control and supervision of several of the individual systems in a large multi-wheel vehicle such as a jet transport aircraft;

FIGURE 2 is a block diagram showing functional units of the invention brake control connected by lines indicating generally their functional relationship to one another; and FIGURE 3 is a detailed circuit diagram depicting details of an exemplary embodiment of the novel control system according to the invention.

Referring to FIGURE 1, there is shown diagrammatically a general arrangement of connections and components according to the invention as applied to an aircraft having four brake-equipped load-bearing wheels including left outboard and inboard wheels 12 and 14, respectively, and right outboard and inboard wheels 16 and 18, respectively. Each wheel has associated therewith a respective transducer 20, a respective primary electrically-controlled valve 22 and a respective second electrically-controlled valve 24, all with connections thereto as indicated to a respective control circuit card 26, diagrammatic representation being employed, rather than actual physical arrangement, in the interest of brevity.

The several control circuits comprised in any and all of cards 26 are connected by leads as indicated, at terminals N to a squat switch circuit means 30, at terminals F to ground, at terminals E and C to a wheel-driven transducer 20, at terminals P to a primary valve 22, at terminals R to a second valve, at terminals A, D, K, L and S to a system test card 32, and at terminals M to the comparable (inboard or outboard) control unit at the opposite side of the aircraft. Card (circuit) 32, of which there is one for the outboard wheel units and one for the inboard wheels units, is used for performing system test operations. As will be evident from consideration of FIGURE 1, the systems may be subjected to testing for ciruit operability while the vehicle is airborne and the wheels and transducers are inoperative, by injection of system-test potential into either of cards 32 by way of leads 34, 35 and 36 connecting test switch 38 and a source of potential (not shown) to a selected one of the cards, thereby simulating generation of a wheel-transducer signal and valve-controlling signal generation. Since the essence of the invention reposes in the circuit means and operation of the control circuits (cards 26), further detailed explanation will be directed primarily to the block diagram of FIGURE 2, and to the detail circuit diagram of FIGURE 3.

Referring to FIGURE 2, a wheel transducer 20 of the type disclosed in detail in the aforementioned applications for patent or of other suitable known type is connected to be actuated or driven by a wheel W (any of wheels 12, 14, 16 and 18, for example) thereby providing an electric A.C. wave of frequency proportional to the rotational speed of the wheel. The output signal of the transducer is transmitted to the squaring type wave-shaping circuit 40 which acts to convert the A.C. signal wave of harmonic-containing sine wave form to square wave form of the same frequency. The square wave output signal of circuit 40 is translated to a velocity amplifier circuit 50 which provides an output signal which is directly proportional to wheel speed but of opposite polarity such that the potential of the output of circuit 50 is low for high wheel speeds and high for low wheel speeds. The amplifier output is subjected to differentiation action and is amplified by a rate amplifier circuit 60, to provide an amplifier output signal representative of the rate of deceleration of the wheel. Action of the rate amplifier circuit is subject to modification by a possible feedback signal that is produced when there occurs in rapid sequence a series of signals representing separate periods of excessive deceleration of the wheel, as will be more fully explained later herein.

The output signal of rate amplifier 60 is translated to a valve driver circuit 70, while being subject to modification by the action of a rate threshold control circuit 80. The valve driver circuit output is supplied to electromagnetic means effective to alter the application of fluid under pressure to brake-actuating means at wheel W, a rising signal being effective to relax or reduce brake application and a falling signal being effective to increase brake application.

Rate threshold control circuit 80 comprises adjustable means whereby the rate of wheel deceleration at which a valve-controlling signal is generated may be pre-set at a desirable maximum rate of deceleration insofar as circuit operation is concerned. Also, as will be more fully explained later in connection with circuit operations, a novel feedback circuit means is provided between the valve driver circuit 70 and the rate threshold circuit 80 whereby in operational effect the system anticipates inertia and sluggishness in the responsiveness of certain components and operates to expedite the end control result that is demanded by the circuitry particularly as respects compensating for adverse inertia factors normally associated with brake reapplication. In this respect the present invention is unique.

Continuing reference to FIGURE 2, transducer 20 is connected also to a power-supply cutoff and fail-safe circuit unit 90 energized from a power-supply unit 100. A touchdown protection unit 170 has connections to velocity amplifier 50 and to unit 90. A system test detector 110 is connected to a system test switch unit 120 connected to a source of A.C. of a suitable test frequency, e.g., 400 c.p.s. The test detector 110 and power supply unit 100 are connected to an indicator driver unit 130 which is connected to a warning lamp unit 140. Valve driver 70 is connected to provide a power pulse to a pressure bias modulation (PBM) circuit 150 each time a driver output signal is generated; and the PBM circuit is connected back to driver circuit 70 for the purpose of prolonging the valve-driving signal to extend brake-relieving action, incident to rapidly repetitive creation of valve-driving signals, by an amount dependent upon the signal amplitudes and duration. As is indicated in FIGURE 2, the valve-driver circuit is connected to supply its output signals to a valve unit 160. It is also pointed out that a squat-switch and relay unit 165 is connected to a touch-down protection circuit 170 which when operated causes valve-driver circuit 70 to completely relax the brake until the wheel becomes load-bearing and acquires a predetermined minimum speed.

As is made evident in FIGURE 2, the above described circuit units are in part duplicated, the diagram serving to depict the interconnections between the circuitry for a related pair of wheels as for example, both outboard wheel circuits of an aircraft, or both inboard wheel circuits. A more specific explanation of pertinent details of the foregoing briefly outlined system will now be given with reference to FIGURE 3.

Referring now to FIGURE 3, arrow-point terminations denominated by capital letters L, K, H, B, J, D, etc., at the left side and bottom of FIGURE 3 correspond in general to the correspondingly denominated terminals on FIGURE 1. The circuits shown in FIGURE 3 are those comprised in units 20, 22, 24, 26, 30, 34, 35, 36, and 30 of FIGURE 1. Thus, at the lower left in FIGURE 3 wheel W (here selected to be wheel 12 but which may be either of wheels 12, 14, 16 or 18) is connected to transducer 20 at terminals E and C. It will be understood that wheel W is equipped with conventional hydraulically actuated braking means manipulated by electromagnetically actuated brake-controlling valve means 160 connected therewith and represented generally by a rectangle at the right of the wheel and having electrical connections at terminals R, P, and a third terminal F leading to ground. Transducer 20 is connected across main regulated power leads J or B+ and ground F it being understood that when wheel W rotates, an A.C. sine wave potential appears across resistor R3. This wave is translated via coupling capacitor C3 to the base of a transistor Q2 which is so biased as to be quickly driven to saturation by the positive half-waves of the incoming transducer signal. Thus the pulses through Q2 provide a substantially square wave potential drop across resistor R9, which square wave is differentiated and rectified by the combination of capacitor C4 and diodes CR11 and CR12, and appears as a current charging C5. At standstill, transistor Q3 is operated in a saturated mode and its output is coupled to transistor Q4 which is operated as an emitter follower. The emitter output of Q4 is fed back to the base of Q3 through resistor R15 to provide necessary base drive for Q3. This base current, however, is summed with the opposing current flowing from C5 through R10 which acts to reduce the drive of Q3. As the potential across R15 drops, increasing base current from Q4 flows through R14 and R16. That increases the potential drop across the emitter resistor of Q4, R12, R13 with the result that an increased bias current is applied through resistor R15 to Q3 to compensate for the velocity signal. Since the velocity signal is derived from the charge on C4, which is discharged once each cycle, the resulting current from C5 is directly proportional to the rotational speed of the wheel. Q3 and Q4 thus operate as linear amplifiers to amplify the velocity signal. Capacitor C7 acts to reduce the response of the amplifier to the ripple component of the velocity signal, and capacitor C6 provides the necessary roll-off for stable gain in a feedback amplifier.

The velocity signal as amplified and forming the output from Q4 is presented to a differentiator capacitor C9 having the ability to operate as a differentiator as well as a coupling capacitor. Whether C9 functions as a coupling capacitor or as a differentiating element depends upon the impedance into which it drives. That impedance comprises two parts, viz: (1) the input impedance of the rate amplifier comprising transistor Q8, the latter impedance being sufficiently high to allow C9 to act as a coupling element through most of the velocity change component, and (2) the impedance presented and controlled by the threshold control circuit comprising transistor Q7 and associated components. Under nominal (no incipient skid) conditions, Q7 operates as a saturated amplifier with a sufficiently low shunt impedance that C9 operates as a true differentiating capacitor at all practical wheel deceleration rates, with the rate current being dissipated in adjustable resistor R22.

The potential drop across the series-connected elements, crystal rectifier CR13 and resistors R11, R12 and R13, as exhibited at junction X1 is substantially zero in the absence of wheel rotation, but increases as wheel rotational velocity increases. Thus the potential, such as V1, normally exhibited at junction X1 during normal wheel rotation, and graphically indicated on FIGURE 3, will commence to rise toward the B+ value as the wheel decelerates and will rise very rapidly as skidding of wheel W commences. Such change of potential at junction X1 is indicated by the dotted "SKID" line in the graph above C8. That portion of the above-noted potential drop developed across CR13 and R11 is applied directly to amplifier transistor Q5. When the wheel velocity is above a minimum level, Q5 operates saturated and provides a backward bias on the emitter of amplifier transistor Q6 whereby Q6 is rendered non-conductive.

The collector of transistor Q5 is connected via blocking rectifier CR15 and junction X2 to terminal M, to which terminal the corresponding junction or part of the circuit of the opposite wheel is connected (see FIGURE 1). Thus, if either of these paired wheels is rotating, a potential, here defined as a locked wheel memory potential, appears at terminal M. Hence, if the velocity of either of the pair of associated wheels drops below a minimum value while the other remains rotating normally, amplifier Q5 of the circuit of the decelerating or skidding wheel will drop out of saturation and thus the back-bias applied to Q6 will disappear and Q6 will become conductive. Q6 will conduct because of the triggering or "turn-on" signal applied from terminal M to the base of Q6 via junctions X2, X3 and X4. Conduction by Q6 produces a potential drop across resistor R29, which potential is effective via resistor R30 to bias Q9 to conductive state. Current through the emitter-collector of Q9 passes to the base of Q10 biasing Q10 to the conducting state. The current then passes along brake signal lead T1, and rectifiers CR8 and CR9 to terminal P of the valve means, thence through the valve-energizing magnet coil and to ground. Thus the output signal of Q9 and Q10 is effective to relax brake application at the slower wheel.

Following relaxation of the brake at wheel W that wheel gains rotational velocity until its speed closely approaches that of its opposite mate. Thus the speed of wheel W rises above the noted minimum, and the circuitry acts as previously described to again cause saturation of Q5 and thereby cause Q6 to become non-conductive. Thus the forward bias on Q9 and Q10 disappears and the valve-controlling signal is then normally terminated. However, resumption of full brake application does not occur immediately because there is included in the circuitry a pressure bias modulation circuit of the type disclosed in the aforementioned application Serial No. 221,650, and which circuit may act to extend the duration of the brake-relaxing signal on line T1.

The base drive for the threshold control transistor Q7 is determined by the potential drop across CR26 and CR20, which for any normal condition may be assumed to be fixed. As the rate component of current shunted through Q7 increases, the potential drop across R22 approaches the base drive potential of Q7, converting it from a low-impedance saturated amplifier to a high-impedance current-limited amplifier. Thus as the rate signal increases, the impedance presented by Q7 rises and the rate signal is in effect converted into a velocity signal (no differentiation) which is proportional to departure of the absolute wheel speed past the threshold value. The thus generated velocity signal is applied as the input to rate amplifier transistor Q8.

Transistor Q8 is nominally biased to near cutoff. When a signal in excess of the calibration limit appears at the base of Q8, it conducts current via resistors R29 and R30 referred to above as the resistors providing the voltage drop effective to bias Q9 to conduction. Capacitor C12 provides a by-pass for high-frequency components. As Q9 conducts, the potential drop across R35 biases emitter follower Q10 to conduct. Both currents provide an augmented or modulated signal on line T1 which expedites speedy energization of the electromagnet means of brake control valve means 160. In the event of a wheel skid in excess of the maximum control limits determined by the design of the valve means, more of the output of Q10 is fed back through the Zener diode CR22 to produce an additional emitter bias for Q8 and thus limiting the maximum output voltage for a skid signal. It is also pointed out that R28 and C11 provide an emitter bias when power is first applied to the circuit, whereby to prevent a turn-on signal. Diodes CR18 and CR19 also function to limit the potential at the base of Q8 during the turn-on transient. CR17 provides a rapid-recovery path for capacitor C9 during wheel speed-recovery periods.

The previously mentioned pressure bias modulation (PBM) circuit comprises resistors R27, R34, R37 and R38, crystal rectifiers CR23, CR24, and CR25, capacitors C13 and C14, and transistor Q11. Functional operation of the circuit to extend the valve-operating signal on line T1 incident to creation of rapidly repetitive signals from Q9 to Q10 caused by, for example, wheel W passing rapidly over areas of low friction coefficient interspersed with areas of higher coefficient on the runway.

As previously indicated, Q10 functions as an emitter-follower and the potential appearing at its base is applied to valve means 160, via lead T1 as a valve-controlling signal herein termed a valve signal. A portion of the output current signal of Q10 passes through CR24 and R37 and charges C13, the charging being added to that occurring through R34. This varies the signal amplitude as a function of the existing charge or PBM signal. When the output signal from Q9 disappears, the charge stored on C13 flows through R34 and CR23 to the base of Q10 and as it decays it acts to control the rate at which braking pressure is increased during reapplication of the brake. It is this control of the initial valve signal that is given the name Pressure Bias Modulation. The amplitude at which control commences is determined by the time-integral of the initial valve signal, and its decay rate is determined by the effective impedance of the discharge path through R35. For a skid signal of long duration the additional charging path through R37 and CR24 permits C13 to be charged to full peak value of the skid signal voltage. Also, the effect of the PBM signal is made additive by the use of R34 as a load resistor for Q9 and connected in series with the PBM potential across C13. Since Q9 operates as a current amplifier, its contribution is independent of collector voltage. Thus the total control potential effective on Q10 is the voltage drop across R34 plus the potential across C13. R37 serves as the bleed path for C13.

A brake-pressure boost pulse is produced after each skid cycle to momentarily interrupt the PBM signal for the purpose of commanding maximum brake fluid flow to the brake for the duration of this interruption. This provides the inertia compensating objectives of this invention. The duration of the mentioned compensating signal is controlled by the selection of appropriate values of the timing components C14 and R38 and the inertia factors of the brake fluid circuit on which the system is to be used. Capacitor C13 charges through diode CR25. However, its discharge path in providing a valve-signal extension is through transistor Q11. The latter transistor is nominally biased to the conductive state by the current through R38; however, at the end of a valve control or skid signal, a negative-going pulse from the valve means is translated over line T1 and through capacitor C14 to the base of Q11 and is effective to bias the latter off, so that the drive to the base of Q10 ends and the signal is terminated. The width or time-duration of the pulse is determined by the rapidity of wheel speed-up following brake relaxation, and the time constant of the R38–C14 circuit. After C14 has discharged, Q11 again conducts and allows the PBM signal to be reapplied to Q10.

A circuit line from the main PBM storage capacitor C13 to a test box terminal L (PBM mute) is provided (via resistor R26 and rectifier CR21) whereby at test, capacitor C13 may be discharged or "muted" and thus rendered ineffective to alter or extend a valve-actuating signal from Q9–Q10.

To provide an anticipatory action in detecting skids, a feedback signal derived at junction X9 incident to valve current flow is conveyed via resistor R32 to the base of threshold control transistor Q7, to modify the nominal bias threshold and reduce the absolute threshold so that incident to a high PBM signal level condition a skid is detected earlier and a stronger brake relaxing signal is provided for the brake control means. Thus the net braking efficiency is materially increased.

The voltage divider provided by diode CR13 and resistors R11, R12 and R13 in the emitter circuit of the velocity signal amplifier Q4, provides the base drive for transistor Q5 causing the latter to conduct linearly whenever a velocity signal exceeding a minimum value is generated, the linear conduction increasing in response to increasing signal strength up to the point where Q5 becomes saturated, and thus there is provided an expanded velocity signal in the low speed range. Capacitor C8 is effective to filter out ripple remaining from the transducer signal. The value of R12 sets the locked wheel actuation point. The collector output signal of Q5 is translated to the common locked wheel memory point at junction X2 via CR15, and also, because of the presence of resistor R21, sets the operating point of Q6.

When a velocity signal is present at the locked wheel common memory junction from the other wheel only, Q6 is saturated causing it to draw collector current which initiates a valve signal. However, if the associated wheel circuit amplifier Q5 is conducting, the collector current of Q5 passes through resistor R21, creating a bias that biases Q6 off. If Q6 is conducting, the current flows through R29 and provides the negative base bias on Q9 to make the latter conduct to produce the valve signal.

The function of R6 and R7 bleeding from B+ into the valve output signals is to provide a bleed current into the valve, insufficient to cause control action, but which, if the valve should open, will provide sufficient drive to the system test card to indicate a malfunction condition. Diodes CR4 through 9 are used to provide isolation for malfunction detection. CR6 and CR7 as well as CR8 and CR9 are paralleled to provide redundant reliability as their failure would not be detected by system test.

In the system test mode, a 400 cycle burst signal is injected into the transducer test point (A) of the card input pins. It is attenuated by R4 and R5 and then passes through the transducer winding and appears as a velocity signal flowing to the velocity amplifier. Upon cessation of this signal, a brake relief signal is obtained which provides an enabling function for the system test card. In the event the transducer is shorted to ground or open, this verification will not be obtained.

Two test points exist on the main wheel card. The first is the active voltage which gives the actual velocity voltage present. This is an inverse relationship to the sense of velocity and is referenced to the B+ line. In other words, at zero velocity, this voltage will be approximately 18 volts and at its full test velocity of 1500 r.p.m. (test set parameter), this voltage will be approximately 6 volts. The other test point is the rate signal which is the output of the threshold amplifier. This point may be used to test the calibration point for the level at which the circuit ceases to be a rate circuit and introduces the velocity component.

Pin "L," labeled "PBM Mute," is connected through R26 and CR21 to the plus side of C13, the PBM capacitor. A connection through CR28 also connects Pin "L" to the base of Q6. The function of this circuit is twofold. During testing of the control circuits, this circuit prevents charging the PBM capacitor by grounding Pin "L" through Q1 of the test and cutout card. This prevents PBM from causing sustained brake release during test. Also, the same circuit momentarily interrupts the touchdown signal for in-flight testing. When the test function is completed, the touchdown signal is restored.

Pin "K" connects the memory signal through R25 to the test and cutout card for logic requirements in the test and failure functions.

Touchdown protection means are provided, whereby the brakes remain completely relaxed until the wheels of a mated pair (left and right outboard wheels, for example) are both down and bearing loads. Thus the "squat" switch 30 of FIGURE 1 (which represents in fact a source of power connected in circuit with a wheel-strut load-sensor and a relay operating in response to change-of-state of the sensor), is arranged to initiate energization of the lines leading to terminals N which in the case of either of the wheel circuits are connected to the junction X3 (FIGURE 3) via resistor R19 and rectifier diode CR14. Thus when the wheel is not supporting a load, the squat switch is closed and thereby potential is applied via R19, CR14, junctions X3 and X4 to the base of Q6 to bias that transistor to conductive state, whereby Q9 and Q10 are biased to produce valve actuating signals despite the fact that the operator or pilot may be operating the brake pedal and that Q5 is inoperative. Incident to all of the wheels assuming a load, the squat switch (relay) will no longer be energized and the circuit through R19, R14, X3 and X4 will be opened to transfer control of Q6 to Q5.

When a failure occurs, the test and cutout card or circuit 32 supplies a ground connection signal to terminal D shown in FIGURES 1 and 3, which signal renders power supply transistor Q1 nonconductive and thus prevents flow of current from terminal B of the power supply into the regulated B+ line. Thus the valve coils cannot be energized and the system reverts to manual control.

The "ACTIVE" termination, H, is on a line connected to junction X1 and hence exhibits a signal or potential that is proportional to rotational velocity of the respective wheel. Variation of that potential appears at differentiating capacitor C9. As noted, if the rate of wheel deceleration is below a determined threshold level, the threshold control transistor Q7 presents a low-impedance path from C9 to ground. Thus the signal voltage at X1 appears across C9, and the current through C9 will be proportional to the rate of change of velocity (deceleration) and will flow via Q7 to ground when Q7 presents a low-impedance path. When the current through C9 exceeds the rate threshold current Q7 can carry, Q7 acts as a high impedance to the excess current, whereby C9 becomes charged to a higher potential. The higher potential is impressed on transistor Q8 which thereupon conducts and produces a forward bias on Q9 to cause the latter (and Q10) to provide a valve-actuating signal to cause brake relaxation. The extent of the relaxation is proportional to the extent of departure of the rate potential above the threshold value and hence is proportional to the extent of rise of the rate of wheel deceleration above the permissible value set by the threshold. The threshold value is adjusted by adjusting R22, and is determined by the difference between the forward potential drops of CR20–CR26 and the base-to-emitter potential of Q7.

There are interposed in the valve-signal line or lead T1 which conveys the signal produced by current flow through transistors Q9, Q10 (or either thereof), two sets of crystal rectifier units, CR6, CR7 and CR8, CR9. These units perform two functions, namely, to couple the valve signal to the secondary and primary valves, and secondly to decouple the valve drive amplifier Q9, Q10 from the valve circuit if an open valve circuit occurs or if a voltage spike appears on the valve circuit which would be dangerous to Q9, Q10.

A locked wheel memory potential is exhibited at junction X2 of elements CR15 and CR16 (FIGURE 3), there being a connection to that junction from all of the several wheel circuit transistors Q5 via respective diodes CR15. Thus the potentials at the outputs of transistors Q5 are compared at junction X2. If the memory potential of the circuit drops due to an incipient skid or due to a locked wheel, diode CR15 back biases and the hold-off potential at the emitter of Q6 falls. Zener diode CR16 will eventually conduct which will cause Q6 to conduct to initiate a valve-actuating signal to relax breaking action at the wheel W. When the wheel regains speed, Q5 will again become saturated to thus bring back the hold-off or blocking potential at the emitter of Q6 and thus terminate conduction of Q6 and the valve signal.

A feedback signal derived incident to creation of a valve-controlling signal by emitter-collector conduction through Q10 is derived at the junction X9 between the collector of Q10 and resistor R36. The feedback signal is translated via resistor 32 to junction X8. The feedback signal is inverse to valve signal potential, since the voltage at junction X9 rises toward B+ potential as conduction of valve signal current through Q10 decreases, and vice versa. The feedback signal through R32 supplies forward bias to CR26 and CR20. Thus when rapidly repetitive valve-actuating skid signals occur, the potential at X9 falls, lowering the forward bias on CR26 and CR20. Hence the potential drops across CR26 and CR20 decrease and lower the threshold of Q7 to augment the magnitude of the brake signal and thereby expediting relaxation of the brake before actual skid can occur.

In an exemplary circuit according to the invention, components and electrical values are as follows:

Resistors:

| | | |
|---|---|---|
| R1 | ohms | 10 |
| R2 | | 1K |
| R3 | | 1.8K |
| R4 | | 1.2K |
| R5 | ohms | 470 |
| R6, R7, R35 | | 6.8K |
| R8, R20 | | 47K |
| R9, R13 | | 2.2K |
| R10 | | 2K |
| R11 | | 1.5K |
| R12 | ohms | 110 |
| R14 | | 10K |
| R15 | | 16.2K |
| R16, R28 | | 15K |
| R17 | | 24K |
| R18, R19 | ohms | 150 |
| R21 | | 5.1K |
| R22 | | 11K |
| R23 | | 220K |
| R24 | | 560K |
| R25 | | 22K |
| R26 | ohms | 39 |
| R27 | | 1M |
| R28 | | 220K |
| R29 | | 16K |
| R30 | | 8.2K |
| R31 | | 4.7K |
| R32 | | 5.1K |
| R34 | | 8.2K |
| R36 | ohms | 110 |
| R37 | do | 680 |
| R38 | | 2.7K |
| R39 | | 27K |
| RT3 (Sensistor) | | 1.5K |

Diodes:

| | |
|---|---|
| CR1, 3, 4–9; 11–15, 18–21, 26 and 27 | IN 645 |
| CR2 | IN 9688 |
| CR10 | IN 965B |
| C16 | IN 957A |
| CR17, 23, 24, 25, 28 | IN 270 |
| CR22 | IN 960B |

Capacitors:

| | | |
|---|---|---|
| C1, C11 | mfd | 68 |
| C2, C6 | mfd | 0.01 |
| C3 | mfd | 4.7 |
| C4 | mfd | 0.047 |
| C5 | mfd | 6.8 |
| C6 | mfd | 0.01 |
| C7 | mfd | 1.0 |
| C8 | mfd | 4.7 |
| C9 | mfd | 47 |
| C11 | mfd | 68 |
| C12 | mfd | 0.22 |
| C13 | mfd | 220 |
| C14 | mfd | 6.8 |

Transistors:

| | |
|---|---|
| Q1 | 2N3036 |
| Q2, Q8, Q10 | 2N1711 |
| Q3, Q4, Q5 and Q9 | 2N3134 |
| Q6, Q7, Q11 | 2N1613 |

While in the preceding description of the invention exemplary circuit means and connections as well as specific electrical values have been set forth by way of example, it will be evident to those skilled in the art that in the light of the present disclosure variations may be made without departing from the true spirit and scope of the invention and without exercise of more than ordinary skill in the art. Accordingly, it is not desired that the invention be restricted to the exemplary details, other than is required by the recitations of the appended claims.

I claim:

1. A vehicle brake control system for a vehicle having a plurality of load-bearing wheels each having a respective brake means associated therewith and electromagnetically actuated brake control means effective when energized to relax brake application, said system comprising:

first means, including, in combination with a first one of the wheels, transducer means associated with said first wheel effective to produce an electric signal which varies with variations of the rate of deceleration of said first wheel;

second means, connected to said first means and including valve driving circuit means connected to said brake control means, effective in response to production by said first means of a signal representing an increase in the rate of deceleration of the said first wheel above a desirable maximum rate to provide electric energizing current to the electromagnetically actuated brake control means to actuate the latter to cause relaxation of brake application to said first wheel;

third means, connected to said second means, effective incident to provision of electric energizing current to said brake control means by said second means to cause a momentary effective rapid reduction in electric energizing current provided to said brake control means by said second means, whereby the time period required to effect desired resumption of brake application to said first wheel is reduced and compensation is provided for inherent inertia in the brake means.

2. A system according to claim 1 characterized in the provision in said third means of control circuit means for setting a signal level representative of said desirable maximum rate of deceleration of said first wheel;

and means effective incident to provision of electric energizing current to said brake energizing means to provide a feedback signal to said control circuit means to cause the latter to effectively lower the set signal level.

3. A system according to claim 1 characterized in the provision in said first means of means for causing said second means to provide electric energizing current to said brake control means to effect brake relaxation despite absence of production of an electric signal indicating variation of the rate of deceleration of said first wheel until a load is borne thereby.

4. A system according to claim 1 characterized in that a second load-bearing wheel has associated therewith first, second and third means as recited in claim 1;

said system including, in association with each of said first and second wheels, a respective locked wheel circuit means connected between the respective first and second means thereof, each said locked wheel circuit means comprising means effective to produce a locked wheel circuit signal effective to augment provision of electric energizing current to the associated brake control means incident to production by the associated first means of a signal representing an increase in the rate of deceleration of the associated wheel above the desirable maximum deceleration rate;

and means connecting the locked wheel circuit means of said second wheel to the locked wheel circuit of said first wheel and effective to increasingly augment provision of electric energizing current to said brake control means of said first wheel incident to nonproduction by said first means associated with said second wheel of a signal representing an increase in the rate of deceleration of said second wheel above the desirable maximum rate of deceleration.

5. A system according to claim 1 comprising in said second means energy-storing means for storing energy supplied by a signal produced by said first means, and variable impedance means forming a shunt discharge path for said energy-storing means, and means connecting said valve-driving circuit means to said variable impedance means and effective in response to provision of electric energizing current to the brake control means to increase the impedance of said variable impedance shunt means to increase the utilization of energy stored in said energy-storing means in effecting provision of electric energizing current to said brake control means whereby to expedite brake relaxation.

No references cited.

EUGENE G. BOTZ, *Primary Examiner.*